(12) United States Patent
Chen

(10) Patent No.: US 6,276,833 B1
(45) Date of Patent: Aug. 21, 2001

(54) LOCKING DEVICE AND ITS RELATED ASSEMBLAGE

(75) Inventor: Lee-Long Chen, Taoyuan Hsien (TW)

(73) Assignee: Delta Electronics, Inc., Taipei (TW)

( * ) Notice: Subject to any disclaimer, the term of this patent is extended or adjusted under 35 U.S.C. 154(b) by 0 days.

(21) Appl. No.: 09/186,600

(22) Filed: Nov. 5, 1998

Related U.S. Application Data

(63) Continuation-in-part of application No. 08/902,646, filed on Jul. 30, 1997, now Pat. No. 5,863,134.

(51) Int. Cl.[7] .................................................. F16C 35/02
(52) U.S. Cl. ......................... 384/226; 384/428; 384/903; 403/326; 411/526
(58) Field of Search ................................ 384/114, 115, 384/119, 120, 107, 108, 111, 113, 226–246, 275, 276, 295, 296, 428, 440, 903; 403/52, 57, 71, 120, 132, 326–328; 411/517, 518, 519, 525, 526, 527

(56) References Cited

U.S. PATENT DOCUMENTS

| | | | |
|---|---|---|---|
| 3,121,583 | * 2/1964 | Damm | 403/326 |
| 3,276,676 | 10/1966 | Buske | 384/100 X |
| 3,494,674 | 2/1970 | Muijderman et al. | 384/113 |
| 3,604,770 | 9/1971 | Peltier | 384/286 |
| 3,663,849 | * 5/1972 | Heob | 310/90 |
| 3,726,575 | * 4/1973 | Moorman | 310/90 |
| 3,893,221 | * 7/1975 | Lehmann | 411/526 |
| 4,302,060 | 11/1981 | Nicholas et al. | 384/111 |
| 4,737,673 | * 4/1988 | Wrobel | 384/295 X |
| 4,747,705 | 5/1988 | Agrawal | 384/118 |
| 4,822,228 | * 4/1989 | Senft et al. | 411/519 |
| 4,968,910 | * 11/1990 | Meier et al. | 384/903 X |
| 5,195,860 | * 3/1993 | Steyn | 411/526 |
| 5,270,737 | 12/1993 | Nagasugi et al. | 384/107 X |
| 5,390,397 | * 2/1995 | Kremer et al. | 411/517 X |
| 5,444,603 | * 8/1995 | Otsuka et al. | 411/526 X |
| 5,562,347 | * 10/1996 | Hsich | 384/296 X |

* cited by examiner

*Primary Examiner*—Thomas R. Hannon
(74) *Attorney, Agent, or Firm*—Lackenbach Siegel Marzullo Aronson & Greenspan

(57) ABSTRACT

A locking device and its assemblage are provided for confining an object. The locking device is used to confine the object having an end having a recess having a defining surface to prevent the object from being displaced in a direction. The locking device is a geometrically closed-loop body having a hollow or cut out portion, and having a flexibility so that upon being applied with an external force, the object will pass through the hollow portion and the end will thus be confined by the locking device while the force disappears. A simple process can be used to assemble and disassemble the locking assemblage.

12 Claims, 2 Drawing Sheets

LOCKING DEVICE AND ITS RELATED ASSEMBLAGE

FIELD OF THE INVENTION

This is a continuation-in-part application of U.S. patent application Ser. No. 08/902,646, filed on Jul. 30, 1997, now U.S. Pat. No. 5,863,134. The present invention relates to a locking device and its related assemblage, and more particularly to a retaining ring for confining a shaft of a motor to prevent the shaft from being displaced in a direction.

BACKGROUND OF THE INVENTION

Motors are widely used in many fields such as CD-ROM or DC motor. In general, a shaft of motor is confined by a retaining ring to prevent the shaft from being displaced in an axial direction. FIG. 1A is a sectional view of the traditional assemblage for confining a shaft of the motor. The assemblage includes a bushing 12, a bearing 11, a shaft 10, and a retaining ring 13. A bushing cover 15 with an external screw thread is disposed in the bottom of bushing 12. The bushing 12 is used to accommodate therein the bearing 11, the shaft 10, and the retaining ring 13. A washer 14 supporting the shaft 10 is disposed on the bushing cover 15. FIG. 1B is a top view of the retaining ring 13 which is an annular plate structure having a gap 131. Because the retaining ring 13 has the gap 131 and a flexibility, the retaining ring 13 must be opened by an external force, thereby an end 102 of shaft 10 will pass through a hollow portion of the retaining ring 13 and a recess 101 of the shaft 10 will be confined by the retaining ring 13 while the end 102 passes through the hollow portion. The shaft 10 is tightly fastened by the retaining ring 13.

However, such a retaining ring still brings about the inconvenience of the assembling process and thus it is desired to modify the design of the retaining ring. The altitude of the shaft is adjusted by the bushing cover 15. If the bushing cover is not closed hermetically, the leakage of lubricant will happen. Furthermore, the altitude of the shaft can not be easily controlled.

Therefore, the present invention provides a practical device and its relative assemblage for obviating the disadvantage of the prior arts as described above.

SUMMARY OF THE INVENTION

An object of the present inventions is to provide a practical locking device and its relative assemblage for confining an object to prevent the object from being displaced in a direction.

According to the present invention, a locking device for confining the object having an end having a recess having a defining surface to prevent the object from being displaced in a direction, is a geometrically closed-loop body having a hollow portion, and has a flexibility that upon being applied with an external force, the object will pass through the hollow portion and the end will thus be confined by the locking device while the force disappears.

In accordance with an aspect of the present invention, the hollow portion has a defining periphery including at least one convex zone spaced from the defining surface of the recess with a first distance while the object is locked by the locking device, and at least one concave zone spaced from the defining surface of the recess with a second distance while the object is locked by the locking device. The first distance is shorter than the second distance. Preferably, the number of convex zones is two or three.

In accordance with another aspect of the present invention, the object is an elongate body having the end and the elongate body is a shaft.

In accordance with another aspect of the present invention, the direction is an axial direction of the shaft.

In accordance with another aspect of the present invention, the end of the object is suitably curved so as to pass through said hollow portion.

In accordance with another aspect of the present invention, the geometrically closed-loop body is a plate structure which is a retaining ring.

In addition, the present invention also provides a locking assemblage which includes an object having an end having a recess having a defining surface, a locking device confining the end of the object, and an integral holder accommodating therein the locking device and the end of the object.

In accordance with another aspect of the present invention, the integral holder includes a holding body having a first chamber and a second chamber, the first chamber accommodating the end of the object, the second chamber accommodating the locking device.

In accordance with another aspect of the present invention, the first chamber and second chamber communicate with each other.

In accordance with another aspect of the present invention, the first chamber has a closed end and the second chamber has an open end.

In accordance with another aspect of the present invention, the recess is an annular groove around the end of the shaft.

In another preferred embodiment of the present invention, a locking assemblage includes an object having an end having a recess therein, a locking device for confining an object having an end having a recess having a defining surface to prevent said object from being displaced in a direction, and a holder accommodating therein the locking device and the end of the object.

In accordance with another aspect of the present invention, the locking device is a geometrically closed-loop body having a hollow portion, and has a flexibility that upon being applied with an external force, the object will pass through the hollow portion and the end will thus be confined by the locking device while the force disappears. The hollow portion has a defining periphery including a convex zone spaced from the defining surface of the recess with a first distance while the object is locked by the locking device, and a concave zone spaced from the defining surface of the recess with a second distance while the object is locked by the locking device.

In accordance with another aspect of the present invention, the end of the object is so curved as to be subserved to pass through the hollow portion.

In addition, the present invention also provides a holder which includes an elongate holding body having a first end, a second end, and a chamber to accommodate an end of an object and a locking device therein, in which the object is free from contact with the locking device a first end part integrally formed to the first end and being closed, a second end part formed on the second end and being open to enable the end of the object and the locking device to pass therethrough, and an internal wall integrally formed to the elongate holding body forming the chamber, wherein the chamber has a stepped surface to thereby form a relatively small chamber accommodating therein the end of the object and a relatively large chamber accommodating therein the locking device.

In accordance with another aspect of the present invention, the holder further accommodates therein a washer to support thereon said shaft.

In accordance with another aspect of the present invention, the holder further accommodates therein a bearing which regulates the shaft to spin therein.

In accordance with another aspect of the present invention, the locking device is a retaining ring.

In accordance with another aspect of the present invention, the first end part and second end part are cylindrical.

In accordance with another aspect of the present invention, the elongate holding body is a bushing.

The present invention may best be understood through the following description with reference to the accompanying drawings, in which:

DETAILED DESCRIPTION OF THE PREFERRED EMBODIMENTS

The present invention provides a locking device and its related assemblage. The locking device is used to confine an object having an end having a recess to prevent the object from being displaced in a direction. The locking device is a plate structure having a hollow portion, and has flexibility so that upon being applied with an external force, the end of the object will pass through the hollow portion and the end will thus be confined by the locking device while the force disappears. The hollow portion has a defining periphery including at least one convex zone, each of which is spaced from the surface of the recess by a first distance while the object is locked by the locking device, and at least one concave zone, each of which is spaced from the surface of the recess by a second distance while the object is locked by the locking device. The first distance is shorter than the second distance. The locking assemblage includes an object having a recess, a locking device confining the recess, and an integral holder accommodating therein the object and the locking device.

Figure 1A:
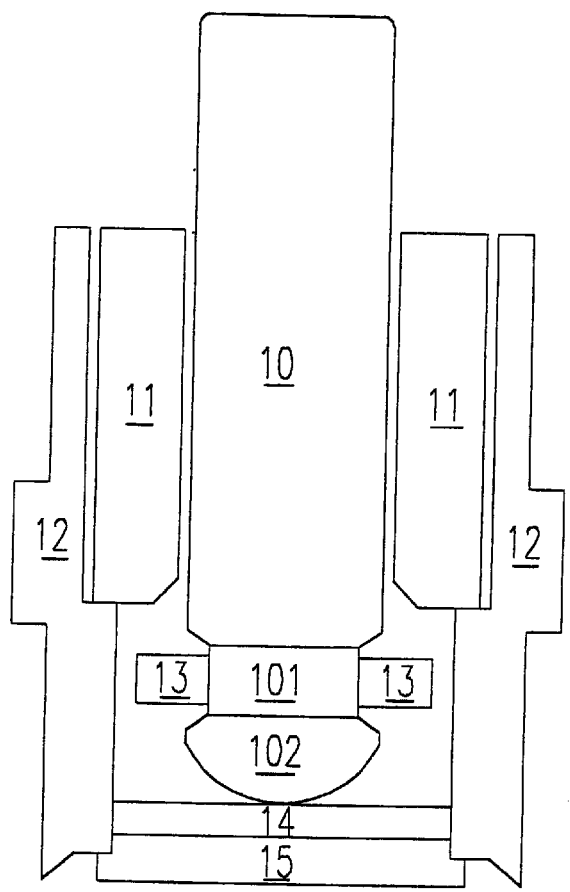
FIG. 1A is a longitudinally sectional view of a conventional locking assemblage for confining the shaft of the motor.
Figure 1B:
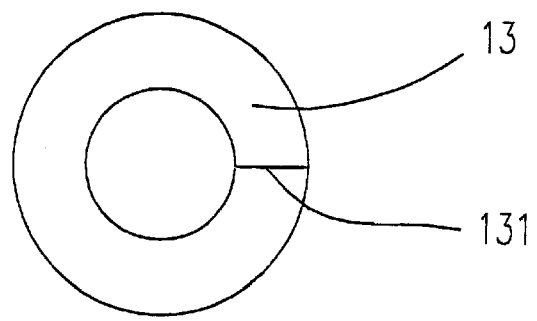
FIG. 1B is a top view of the conventional retaining ring.
Figure 2A:
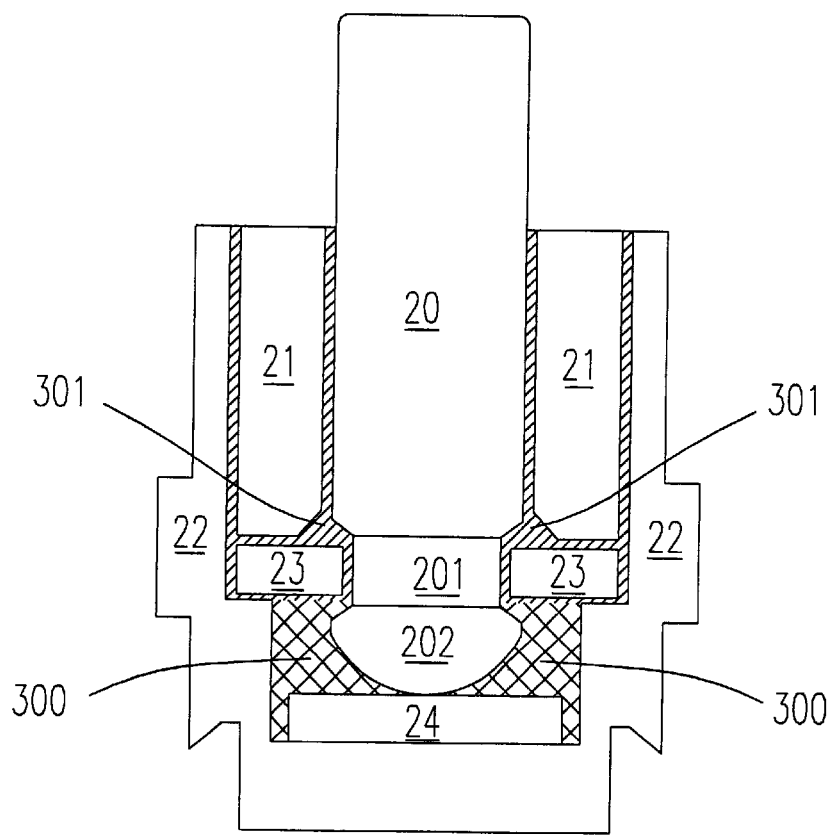
FIG. 2A is a sectional view of the preferred embodiment of a locking assemblage according to present invention.

The preferred embodiment of present invention, as shown in FIG. 2A, is a locking assemblage. A retaining ring 23 is used to confine a the shaft 20 having an end 202 having a recess 201 to prevent the shaft 20 from being displaced in the axial direction. The retaining ring 23 is a plate structure having a hollow portion, and has flexibility that upon being applied with an external force, the shaft 20 will pass through the hollow portion and the end 202 will thus be confined by the retaining ring 23 while the force disappears. The end 202 of the shaft has a curved surface to pass through the hollow portion. The recess 201 has a defining surface in the end 202 of the shaft 20. The recess 201 is an annular groove around the end 202 of the shaft 20 which is not contacted with the retaining ring 23 when the shaft is spinning.

Figure 2B:
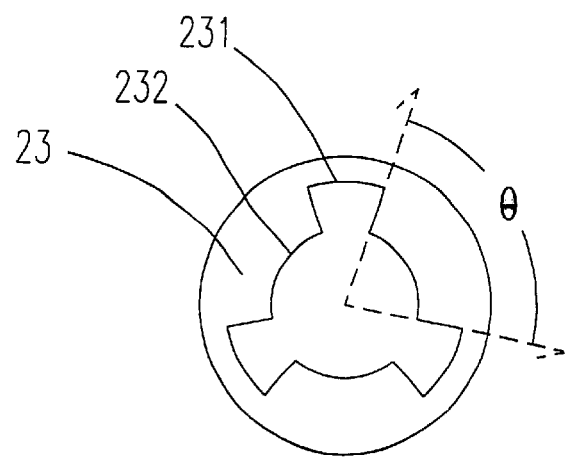
FIG. 2B is a top view of the preferred embodiment of a locking device according to present invention.

FIG. 2B shows that the hollow portion has a defining periphery including three convex zones 232, each of which is spaced from the defining surface of the recess 201 with a first distance while the shaft 20 is locked by the retaining ring 23, and three concave zones 231, each of which is spaced from the defining surface of the recess 201 with a second distance while the shaft 20 is locked by the retaining ring 23. The first distance is shorter than the second distance.

Referring FIG. 2A again, the locking assemblage includes a shaft 20 having an end 202 having a recess 201, a retaining ring 23 confining the shaft 20, and an integral bushing 22 accommodating the end 202 of the shaft 20 and the retaining ring 23 therein. The bushing 22 having an integral body has a first chamber 300 and a second chamber 301. The first chamber 300 which further accommodates the washer 24 supporting the shaft 20 has a closed end. The second chamber 301 has an open end and accommodates the bearing 21 which regulates the shaft 20 to spin therein. The first chamber 300 and the second chamber 301 communicate with each other. A stepped surface formed inside the bushing 22 is used to divide the internal space of bushing 22 into a relative small chamber and a relative large chamber, and the relative small chamber is the first chamber 300. The relative large chamber is the second chamber 301.

The present invention provides a simple process to assemble a locking device with the shaft of the motor. Firstly, the washer 24 is placed on the bottom of first chamber 300 of the bushing 22. Secondly, the retaining ring 23 is put on the bottom of the second chamber 301. Thirdly, the bearing 21 is pressed into the second chamber 301. Finally, the shaft 20 is inserted into the central space of the bearing 21. An external force is applied upon the shaft 20 so as to enable the shaft 20 to pass through the hollow portion of the retaining ring. The end 202 will thus be confined by the retaining ring 23 while the external force disappears. The novel locking assemblage aids in avoiding leakage of oil and provides a more precise altitude of the shaft 20.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A locking assemblage comprising:
    an object having a recess portion at one end thereof; a locking device including a flexible retaining body which is of a flat plate structure with a hollow portion therein for passing therethrough said object and retaining said recess portion of said object therein, said hollow portion having a defining periphery which includes alternate convex and concave zones, and defines a space allowing said recess portion to be retained therein without contact with said flexible retaining body; and
    a holder having a bottom end and a wall thereof integrally formed and a top end thereof open for receiving said object and said flexible retaining body from said top end;
    wherein an external force is exerted onto said object to prop open said flexible retaining body and enter said hollow portion for assembling, and removed when said recess portion is combined with and retained by said flexible retaining body.

2. The assemblage of claim 1, wherein said holder comprises a holding body having a first chamber and a second chamber, said first chamber accommodating said end of said object, said second chamber accommodating said locking device.

3. The assemblage of claim 2, wherein said first chamber and second chamber communicate with each other.

4. The assemblage of claim 2, wherein said first chamber has a closed end.

5. The assemblage of claim 2, wherein said second chamber has an open end.

6. The assemblage of claim 1, wherein said object is a shaft of a motor.

7. The assemblage of claim 6, wherein said shaft is retained by said flexible retaining body to prevent from displacing in an axial direction of said shaft.

8. The assemblage of claim 7, wherein said recess portion is depressed from a shaft surface by means of an annular groove provided around said end of said shaft.

9. A locking assemblage comprising:

an object having a recess at one end thereof;

a locking device for confining said object to prevent said object from being displaced in a direction by being retained in said recess, said locking device being a flexible body of a closed-loop flat plate structure with a hollow portion therein, wherein a defining periphery of said hollow portion includes a convex zone spaced from said defining surface of said recess by a first distance and a concave zone spaced from said defining surface of said recess by a second distance when said object is locked by said locking device; and a holder having a bottom end and a wall thereof integrally formed and a top end thereof open for receiving said object and said flexible body from said top end; wherein an external force is exerted onto said object to prop open said flexible body and enter said hollow portion for assembling, and removed when said flexible body of said convex zone enters said recess.

10. The assemblage of claim 9, wherein said object is a shaft.

11. The assemblage of claim 10, wherein said direction is an axial direction of said shaft.

12. The assemblage of claim 10, wherein an end portion of said object in front of said recess at said end is curved so as to facilitate said object to prop open said flexible body and pass through said hollow portion.

* * * * *